United States Patent
Krishnaswamy

(10) Patent No.: US 6,308,318 B2
(45) Date of Patent: Oct. 23, 2001

(54) METHOD AND APPARATUS FOR HANDLING ASYNCHRONOUS EXCEPTIONS IN A DYNAMIC TRANSLATION SYSTEM

(75) Inventor: Umesh Krishnaswamy, Sunnyvale, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/167,284

(22) Filed: Oct. 7, 1998

(51) Int. Cl.$^7$ .................................................. G06F 9/45
(52) U.S. Cl. ................................. 717/5; 717/7; 712/227
(58) Field of Search ........................... 717/5, 7; 703/23; 712/209, 227; 370/257; 711/150

(56) References Cited

U.S. PATENT DOCUMENTS

| | | | |
|---|---|---|---|
| 5,572,525 | * 11/1996 | Shen et al. | 370/257 |
| 5,732,235 | * 3/1998 | Kahle et al. | 712/209 |
| 5,742,802 | * 4/1998 | Harter et al. | 712/227 |
| 5,758,140 | * 5/1998 | Kahle et al. | 712/227 |
| 5,764,962 | * 6/1998 | Buzbee | 707/23 |
| 5,832,205 | * 11/1998 | Kelly et al. | 714/38 |
| 5,838,978 | * 11/1998 | Buzbee | 717/5 |
| 5,895,494 | * 6/1998 | Scalzi et al. | 711/150 |
| 6,021,275 | * 2/2000 | Horwat | 717/7 |
| 6,031,992 | * 2/2000 | Cmelik et al. | 7171/5 |
| 6,044,220 | * 3/2000 | Breternitz, Jr. | 717/5 |

OTHER PUBLICATIONS

Proebsting–Townsend–Bridges–Hartman–Newsham, Toba: Java for Applications A Way Ahead of Time (WAT) Compiler, Jun. 1997, Proceedings of the Third USENIX Conference on Object–Oriented Technologies.*

* cited by examiner

Primary Examiner—Kakali Chaki
Assistant Examiner—Hoang-Vu Antony Nguyen-Ba

(57) ABSTRACT

A method and apparatus for handling asynchronous exceptions in a dynamic translation system. In accordance with the present invention, the dynamic translation system utilizes an interpreter to determine when a point in the translated code has been reached at which application state is recoverable. When an asynchronous event occurs, execution of translated instructions in hardware is halted and control is transferred to the interpreter at the point at which the exception occurred during the translation. The interpreter then executes the translated code from the point of interruption and checks for a guaranteed application state recoverable point, or GAR point, at the end of each instruction or block of instructions. Once a GAR point is reached, control is transferred to an asynchronous exception handler. Since control is only transferred to the interpreter once an asynchronous exception has occurred, overhead relating to the handling of asynchronous exceptions is only incurred when an asynchronous exception is actually pending.

19 Claims, 5 Drawing Sheets

US 6,308,318 B2

METHOD AND APPARATUS FOR HANDLING ASYNCHRONOUS EXCEPTIONS IN A DYNAMIC TRANSLATION SYSTEM

TECHNICAL FIELD OF THE INVENTION

The present invention relates to dynamic translation systems which translate input object code designed for use in one environment into output object code for use in another environment. More particularly, the present invention relates to a method and apparatus for asynchronous exception handling in such a dynamic translation system.

BACKGROUND OF THE INVENTION

Dynamic translation systems translate input object code native to one computer system into output object code native to another computer system. A typical use of a dynamic translation system is to transparently migrate old software into a new platform that can be executed on a new machine. Other uses of dynamic translation systems include collecting instrumentation information, translating object code intended for use with a particular hardware implementation into object code that can be used with a different hardware implementation, and translating slow object code into fast object code by optimizing the code based on execution profile information. Unlike a compiler, which translates source code into executable code before run time, a dynamic translator translates the input object code into the output object code during run time, i.e., on the fly.

One of the more difficult tasks performed in a dynamic translation system is the handling of asynchronous exceptions. Asynchronous exceptions are events which interrupt the flow of control of a program in order to handle an externally triggered event. When an asynchronous exception occurs, the dynamic translation system must simulate, during the execution of the translated application code, the handling of the asynchronous exception by the input application code. This is a difficult task and is further complicated due to the fact that asynchronous exceptions can occur at any time.

Oftentimes, a single instruction in the input object code may be translated into multiple instructions in the output object code. It is possible that an asynchronous exception or event will occur during the translation of an instruction in the input object code into multiple instructions in the output object code. For example, in the case where an instruction in the input object code is mapped into three instructions in the output object code, it is possible that an asynchronous event will occur after the first instruction in the native object code has been produced, but before the second instruction in the native object code has been produced. Since an asynchronous exception handler must be provided with an accurately reconstructed application context, the asynchronous exception handler cannot be provided with the reconstructed application context before all of the instructions in the output object code which correspond to the single instruction in the input object code have been translated.

FIGS. 1A and 1B illustrate exception handling during normal execution of an application program 1 and during translation of application program 1 in a dynamic translation system, respectively. FIG. 1A depicts a program 1 being executed by hardware 2 running operating system 3. When an asynchronous event 6 occurs during execution of the instructions comprised by the program 1, the normal flow of control of execution is transferred, as indicated by arrow 8, from the point of interruption 5 to the event handler routine 7 comprised by the program 1. The input to the event handler routine 7 corresponds to the instruction pointer at the point of interruption 5 and the hardware register state at the point of interruption. Both of these inputs must be correct in order for the exception to be correctly handled by the event handler routine 7. Once the exception has been handled by the event handler routine 7, execution resumes from the point of interruption 5 in accordance with the normal flow of control of execution.

FIG. 1B illustrates the situation where translated code contained in a code cache memory device 9 of a dynamic translation system 10 is interrupted by an asynchronous event 11 during dynamic translation execution. Control is then transferred, as indicated by arrow 12, to the event handler routine 7 of the application program 1. Since there is not necessarily a 1-to-1 mapping between the code of the untranslated program 1 and the translated code in the code cache memory 9, the point of interruption, as well as the hardware register state at the point of interruption, input to the event handler routine 7 will be different than if the asynchronous event had occurred during normal execution of the program 1 in the manner shown in FIG. 1A. If control is transferred in this manner, the event handler routine 7 will behave incorrectly and will produce an incorrect result before returning to the point of interruption in the code cache memory 9.

Therefore, the dynamic translation system 10 must intercept the asynchronous event and recover the register state and instruction pointer at the time of the event before transferring control to the event handler routine 7. The register state and instruction pointer cannot be recovered at arbitrary points in the instruction stream because it is not guaranteed that the state of the hardware register and the value of the instruction pointer will be correct at arbitrary points. When an asynchronous event occurs at an arbitrary point in the code cache memory 9, the instruction pointer is pointing to a translated code location. However, when the asynchronous event occurs at a point in the program code 1, the instruction pointer is pointing to a location in the program code 1 which may not be the same as the location in the translated code.

Various approaches have been used in conjunction with dynamic translation execution to ensure that the reconstructed application context (i.e., the hardware register state and the instruction pointer) is correct when control is transferred to an asynchronous exception handler. These approaches utilize guaranteed application state recoverable points, hereinafter referred to as GAR points, which are points programmed into the translated code, usually at the end of a translated block. These prior approaches record the occurrence of an asynchronous exception and continue execution of instructions from the point of interruption until a GAR point dynamically following the point of interruption has been reached. The application context is always accurate at the GAR point. Therefore, when a GAR point is reached in the instruction stream, control is transferred to the asynchronous exception handler.

Buzbee, U.S. Pat. No. 5,764,962, discloses a dynamic translation system which utilizes a branch-target register which is globally-allocated and which contains an address of an asynchronous signal handler. When a determination is made that an asynchronous signal has arrived, the dynamic translation system records the event and sets a Boolean flag in a globally-allocated predicate register to indicate that an asynchronous signal has arrived. Translation is then resumed from the point of interruption. When the translation reaches a "transfer of control operation" inside a block of code, the transfer of control operation uses as a predicate the contents of the predicate register and branches to an address stored in the branch-target register when the bit in the predicate register is set.

All of the prior approaches for handling asynchronous exceptions, including the approach disclosed in the Buzbee patent, detect when an asynchronous exception has occurred, record the asynchronous exception, continue execution until a GAR point is reached, and transfer control to the asynchronous exception handler for servicing the asynchronous event when the GAR point is reached. These GAR points correspond to instructions embedded in the translated code which correspond to locations in the instruction flow where state can be recovered. In addition, the GAR points often include instructions which cause the dynamic translation system to check to determine whether an asynchronous event has occurred. For example, the Buzbee patent discloses "transfer of control operations", which are instructions located at GAR points that cause the predicate register to be checked to determine whether the flag is set. Control is only transferred to the asynchronous signal handler if this flag is set, which is only set if an asynchronous signal has occurred.

One of the problems associated with the prior approaches is that it is difficult for the processor executing the translated instructions to recognize when a GAR point has been reached and immediately halt execution of instructions. Furthermore, overhead is consumed at GAR points in determining whether an asynchronous exception has occurred. For example, the Buzbee patent refers to each block of translated code including a transfer of control operation. When the transfer of control operation is executed, a check is made to determine whether an asynchronous exception has occurred by checking the predicate register to determine whether the flag in the register has been set. If it has been set, control is transferred to the asynchronous signal handler. Therefore, this check is made even when an asynchronous signal has not occurred.

Accordingly, a need exists for a method and apparatus for handling asynchronous exceptions in a dynamic translation system which minimizes the overhead required for handling such events and which are flexible in terms of hardware needed for implementation.

SUMMARY OF THE INVENTION

The present invention provides a method and apparatus for handling asynchronous exceptions in a dynamic translation system. In accordance with the present invention, the dynamic translation system utilizes an interpreter to determine when a GAR point in the translated code has been reached. Interpreters are typically implemented in dynamic translation systems for performing tasks, such as, for example, generating profile information that indicates which instructions are being frequently executed, i.e., which instructions are hot. Such interpreters are implemented in software which translates code on an instruction-by-instruction basis and generates profile information relating to the translated instructions. Since interpreters are typically present in dynamic translation systems, existing interpreters can be modified in accordance with the present invention, or an existing interpreter can be replaced with an interpreter designed in accordance with the present invention, to determine whether a GAR point has been reached in the translated code.

In accordance with the present invention, when an asynchronous event occurs, execution of translated instructions in the hardware of the dynamic translation system is halted and control is transferred to the interpreter at the point at which the exception occurred during the translation. The interpreter then executes the translated code from the point of interruption and checks for a GAR point at the end of each instruction or at the end of a block of instructions. The manner in which the interpreter checks for a GAR point generally depends on how the GAR points have been programmed into the translated code. Once a GAR point is reached, control is transferred to an asynchronous exception handler.

Thus, in accordance with the present invention, overhead relating to the handling of asynchronous exceptions is only incurred when an asynchronous exception has actually occurred, i.e., only when an asynchronous exception is currently pending. This is because control is only transferred to the interpreter once an asynchronous exception has occurred. interpreters typically execute instructions much slower than the hardware of the dynamic translation system, since GAR points normally are only separated by approximately 10 or 15 instructions, any overhead resulting from the slower instruction execution rate of the interpreter is still much less than the overhead that would be incurred by executing GAR point instructions to determine whether an asynchronous exception has occurred.

These and other advantages and features of the present invention will become apparent from the following description, drawings and claims.

DETAILED DESCRIPTION OF THE INVENTION

Figure 1A:
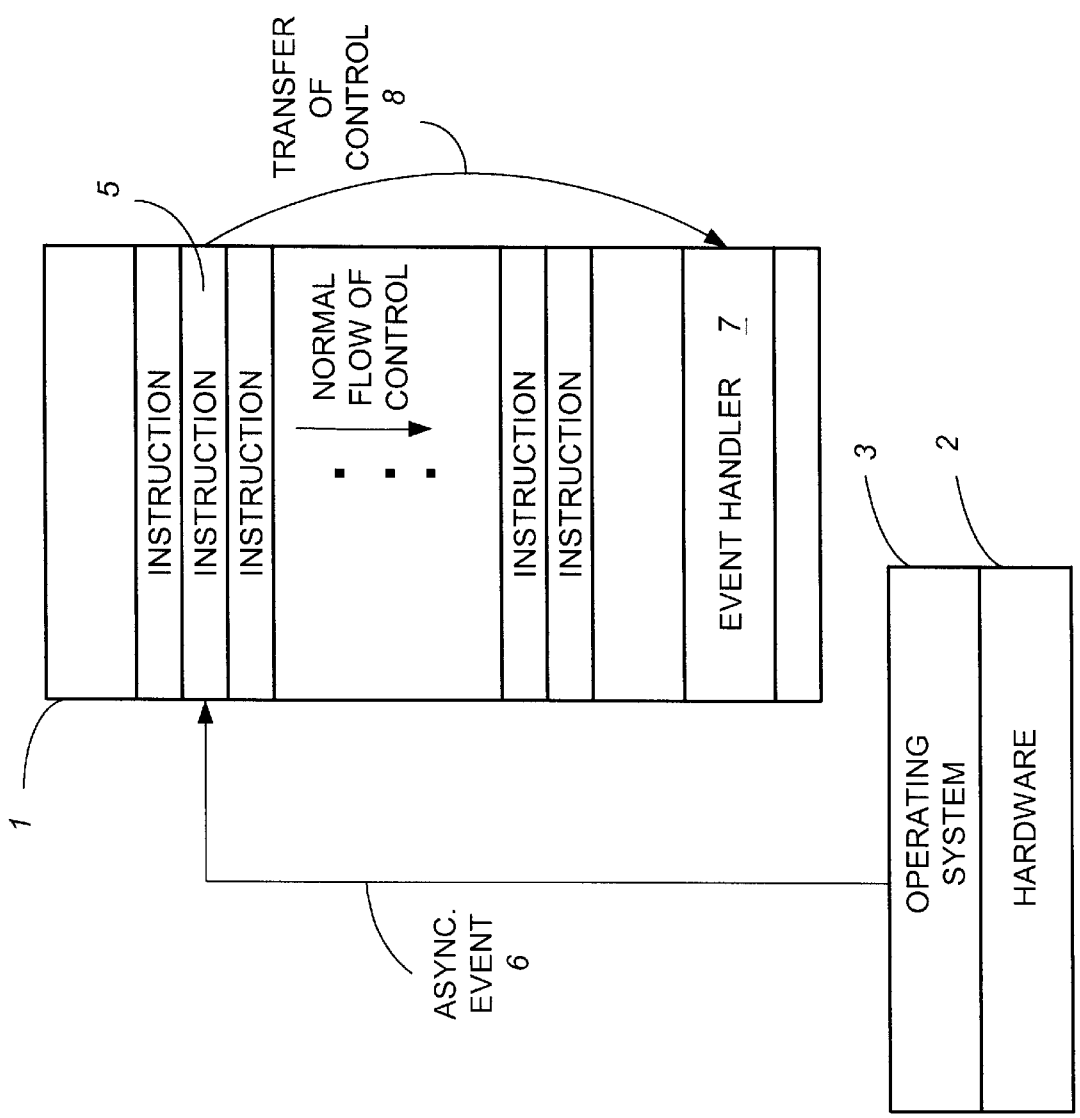
FIG. 1A illustrates asynchronous exception handling during normal execution of an application program.
Figure 1B:
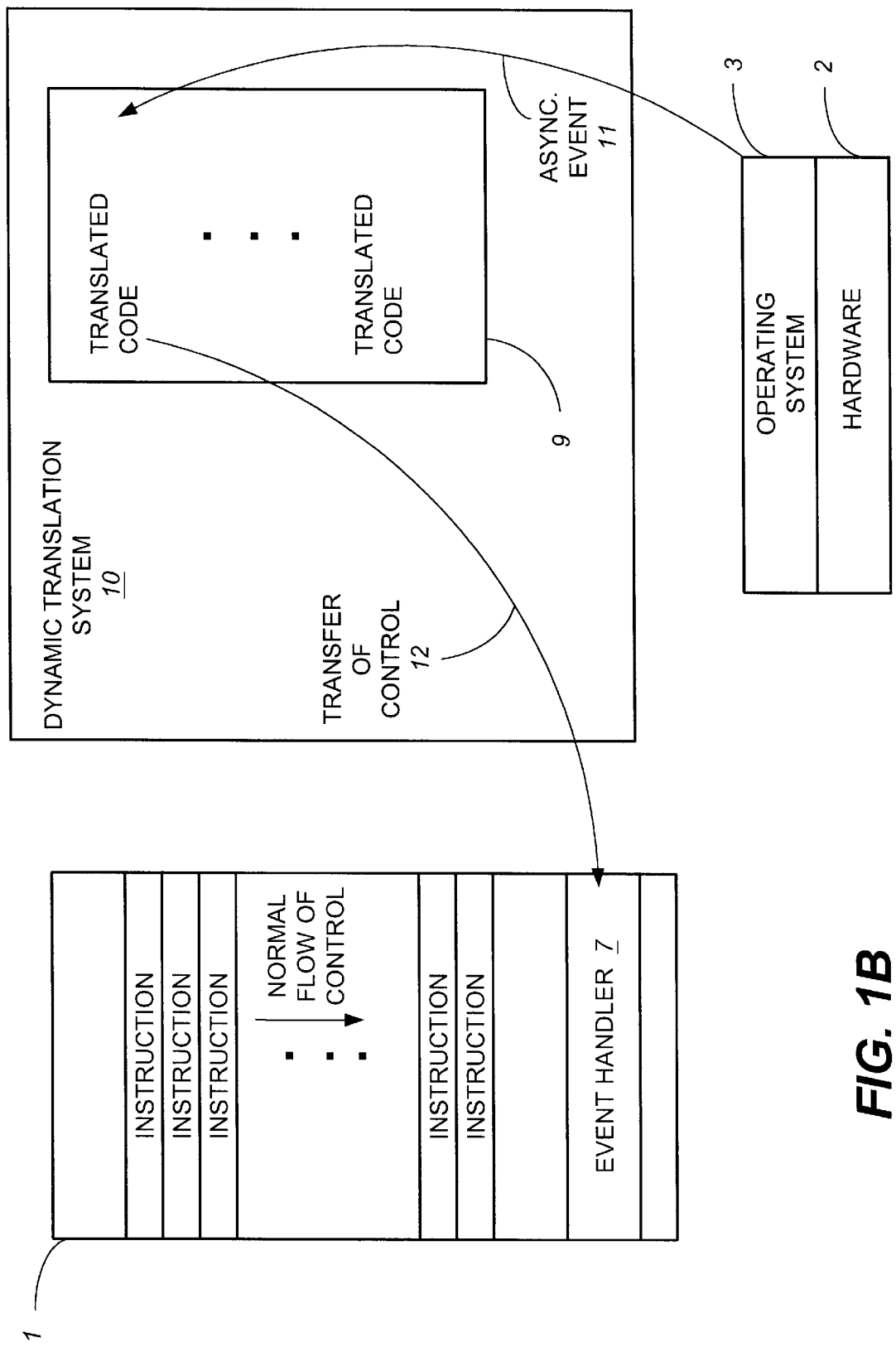
FIG. 1B illustrates an improperly handled asynchronous exception during translation of application program in a dynamic translation system.
Figure 2:
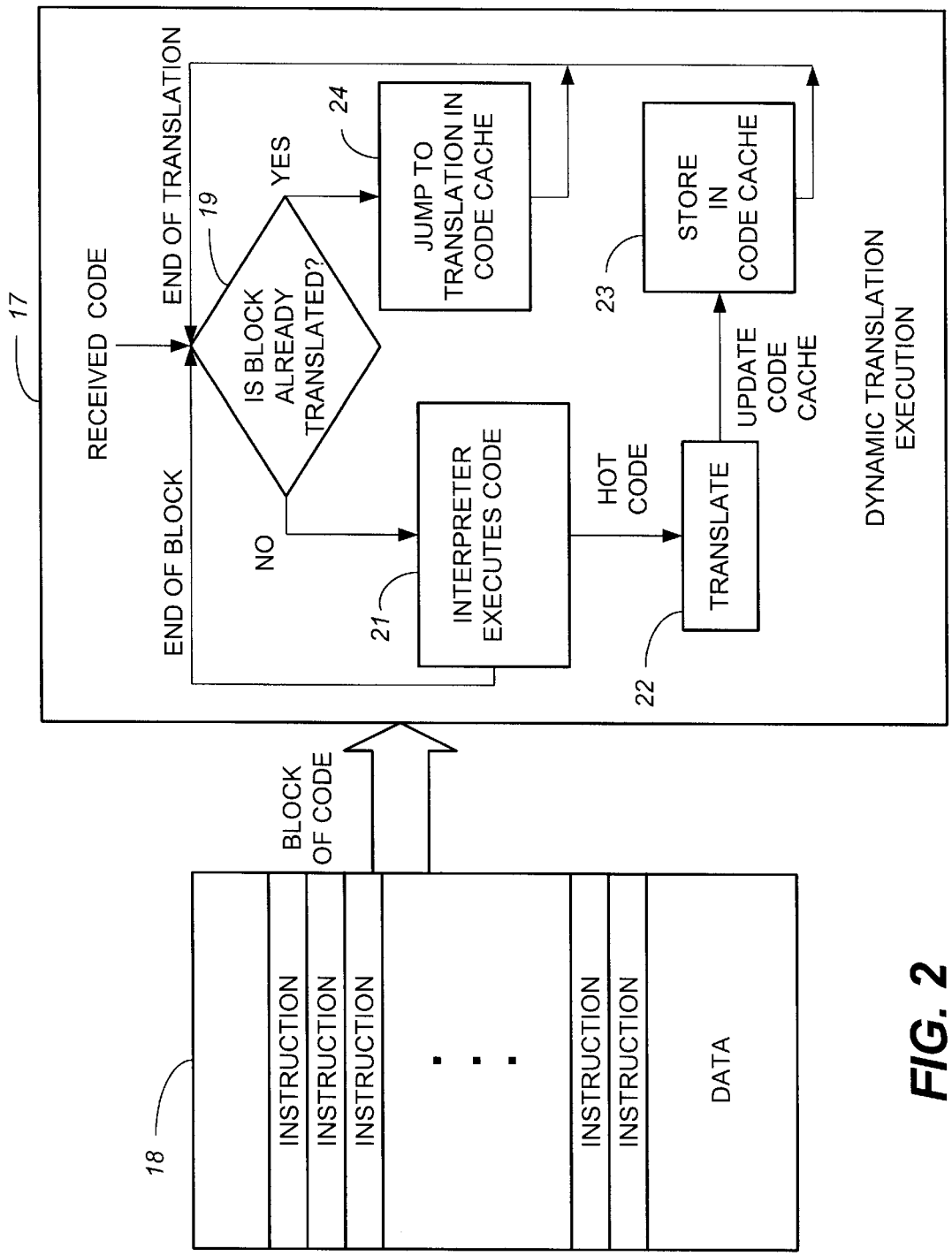
FIG. 2 is a flow chart functionally illustrating asynchronous exception handling during dynamic translation execution in accordance with the present invention.

FIG. 2 illustrates dynamic translation execution in accordance with the present invention for translating input object code into output object code. The input object code 18 may be, for example, an old application program which is not capable of being run on a current computer system (not shown) and which must be converted into native object code in order to run on the current computer system. The dynamic translation system of the present invention is capable of translating the input object code 18 into output object code on the fly, i.e., during run time. It should be noted that the dynamic translation system of the present invention is not limited with respect to the type of code it is capable of translating.

As shown in FIG. 2, blocks of code corresponding to input object code 18 are delivered to the dynamic translation system of the present invention, which is functionally illustrated by the flow chart contained in block 17. A determination is made at block 19 as to whether the block of code has already been translated. If so, the system controller transfers control to the translated code which was previously stored in the code cache, as indicated by block 24. If not, an interpreter executes the input code as indicated by block 21 and provides the hot code, which corresponds to a block or blocks of code which are being repeatedly executed, to the translator of the dynamic translation system, which is functionally represented by block 22. The hot code is then translated and the code cache is updated with the translated code, as indicated by blocks 22 and 23.

When an asynchronous exception occurs, the interpreter begins executing the translated code instruction-by-instruction and notifies the controller of the dynamic translation system when a GAR point has been reached, as represented by the arrow from block 21 to block 19. When a GAR point is reached, control is transferred to an asynchronous exception handler.

Figure 3:
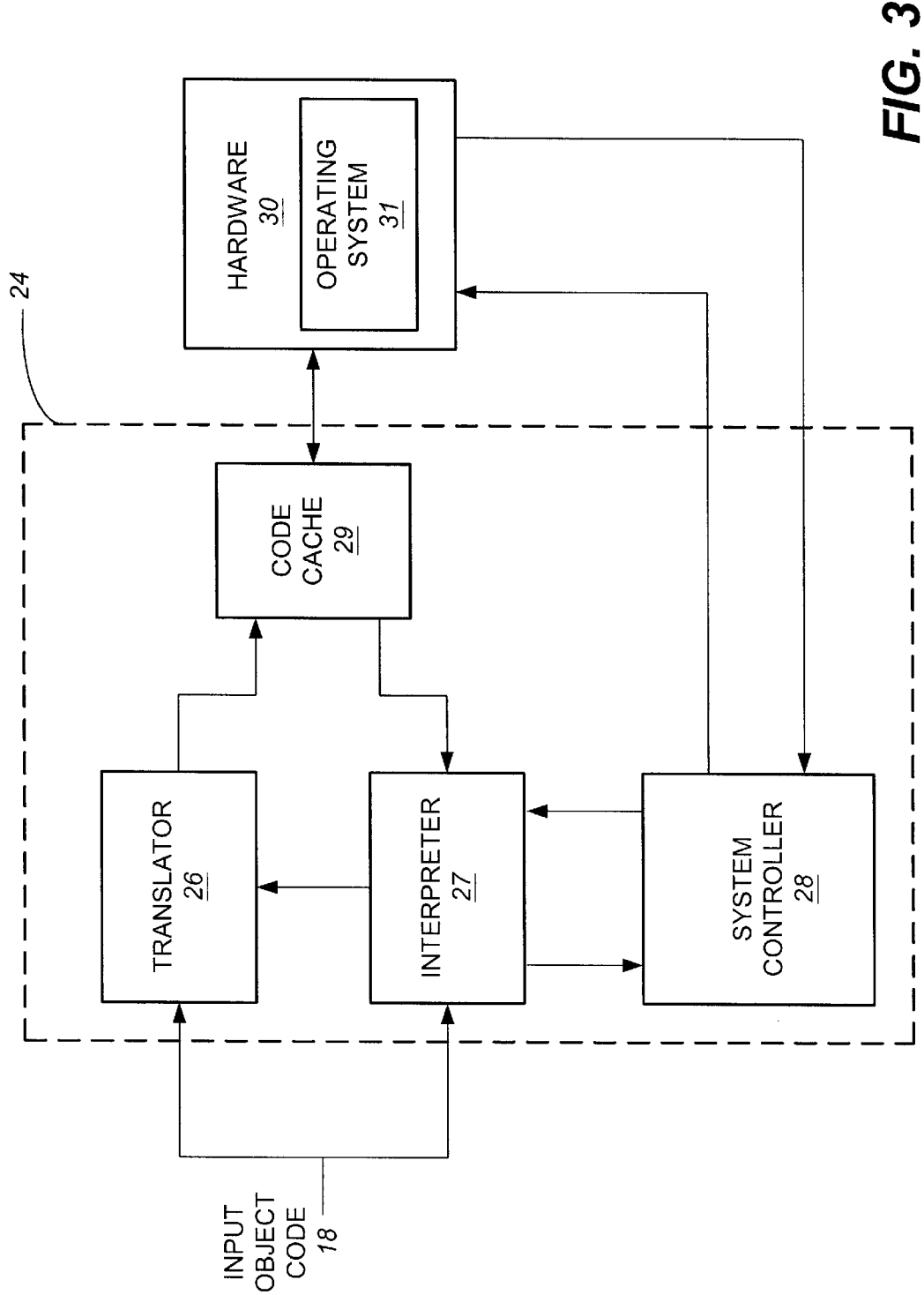
FIG. 3 illustrates a functional block diagram of the dynamic translation system of the present invention in accordance with the preferred embodiment.

FIG. 3 illustrates a functional block diagram of the dynamic translation system 24 of the present invention. The dynamic translation system 24 receives input object code 18 to be translated into output object code (not shown) which can be run on hardware 30. The hardware 30 includes a computer such as, for example, a microprocessor. The hardware 30 is operating under control of an operating system 31.

The dynamic translation system 24 of the present invention preferably comprises a translator 26, an interpreter 27, a code cache memory 29 and a system controller 28. However, as will be understood by those skilled in the art that some of these components, such as the system controller, for example, can be outside of the system 24 but in communication with the system 24. The system controller 28 is notified by the operating system 31 when an asynchronous event has occurred. The system controller 28 then controls the interpreter 27 and the hardware 30 in accordance with the present invention in the manner described below to enable the asynchronous event to be handled.

As stated above, interpreters are typical components of dynamic translation systems. However, the manner in which the interpreter 27 of the present invention operates to facilitate the handling of asynchronous events or exceptions is unique to the present invention. Before discussing the operations of the interpreter 27 of the present invention with respect to asynchronous events, the typical operations of an interpreter in a dynamic translation system will be briefly discussed, since the interpreter 27 preferably also performs these tasks. The interpreter 27, in performing its normal tasks, executes instructions of the input object code 18 and generates profile information relating to the input object code 18. This profile information includes information identifying which instructions or blocks of instructions of the input object code 18 are hot, i.e., frequently executed. The interpreter 27 informs the translator 26 of the identity of the hot code. The translator 26 uses this information to determine which blocks of the input object code 18 need to be translated and placed in the code cache memory 29. The hardware 30 receives the translated code from the code cache memory 29 and executes the translated code.

The interpreter 27 preferably is implemented in software, as are most interpreters currently implemented in dynamic translation systems However, those skilled in the art will understand that the functions of the interpreter can be implemented in hardware as well, or in a combination of hardware and software. When implemented in software, the interpreter 27 is stored in a memory device (not shown) which is accessed by, and which may be comprised as part of, hardware 30.

In accordance with the present invention, when an asynchronous exception occurs, the system controller 28 causes the hardware 30 to halt execution of the translated code. The system controller 28 then determines whether the hardware is at a GAR point in the stream of instructions being executed. If so, the system controller 28 causes the flow of control to be transferred to an asynchronous exception handler (not shown). If the hardware 30 is not at a GAR point in the instruction execution stream when the system controller 28 receives the asynchronous exception, the system controller 28 halts execution of instructions by the hardware 30 and transfers control to the interpreter 27. The interpreter 27 then executes translated instructions one-by-one and checks to determine whether a GAR point has been reached in the instruction stream.

Preferably, the interpreter checks for a GAR point at the end of each basic block of instructions. For purposes of discussion, a basic block is a sequence of instructions which ends with a branch and which contains no other branches. However, it should be noted that the frequency with which the interpreter 27 checks to determine whether a GAR point has been reached can be preselected such that checks are made at any desired point in the instruction stream. It will be understood by those skilled in the art that the locations at which GAR points are inserted into the translated code by translator 26 can be preselected for convenience and/or efficiency.

When the interpreter 27 reaches a GAR point in the instruction stream, it notifies the system controller 28 that is has reached a GAR point. In turn, the system controller 28 reconstructs the application context and transfers control to an asynchronous exception handler (not shown). The system controller 28 then causes the next block of code to be processed.

It should be noted that the dynamic translation system 24 of the present invention does not perform checks to determine whether an asynchronous exception has occurred. The interpreter 27 only takes control once an asynchronous event has occurred. The operating system 31 notifies the system controller 28 that an asynchronous exception has occurred. Therefore, no overhead is incurred in executing instructions to determine whether an asynchronous exception has occurred.

Figure 4:
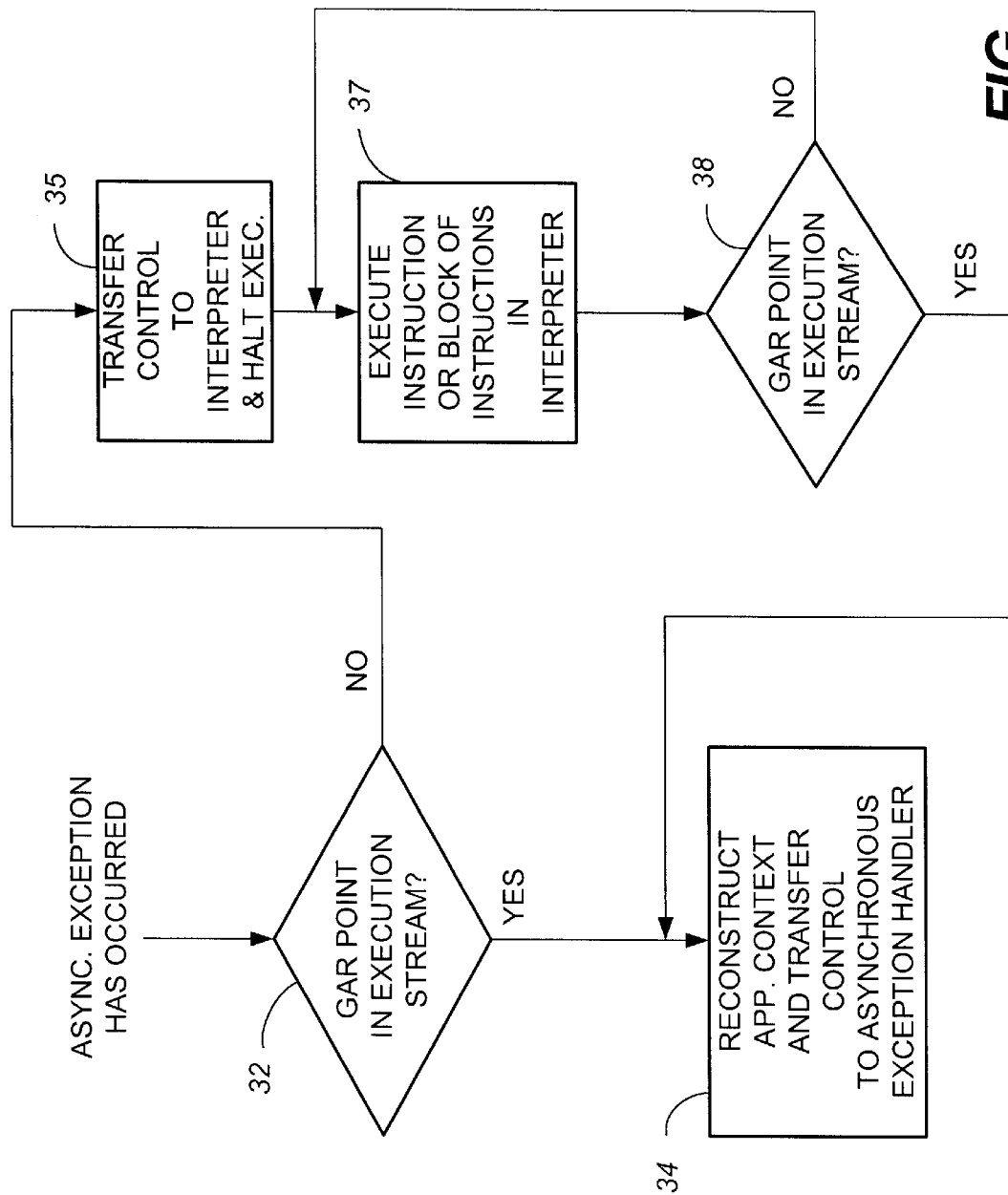
FIG. 4 is a flow chart depicting the method of the present invention for handling asynchronous exceptions during dynamic translation execution in accordance with the preferred embodiment.

FIG. 4 is a flow chart depicting the method of the present invention in accordance with the preferred embodiment. The system controller 28 performs its normal functions of controlling the flow of control of the dynamic translation system 24 until it is notified by the OS 31 that an asynchronous exception has occurred. At that time, the system controller 28 halts execution of the input object code and causes the hardware 30 to execute the exception handler routine. The hardware 30 checks to see whether it is at a GAR point in the execution stream, as indicated by block 32. If a GAR point in the execution stream has been reached, the system controller 28 reconstructs the application context and transfers control to the asynchronous exception handler, as indicated at block 34. If a determination is made at block 32 that a GAR point in the execution stream has not been reached, the system controller 28 transfers control to the interpreter 27 and halts instruction execution, as indicated at block 35.

The interpreter 27 executes instructions or blocks of instructions and looks for GAR points which have been programmed into the translated code, as indicated at blocks 37 and 38. When the interpreter 27 determines that a GAR point has been reached in the execution stream, the interpreter 27 transfers control to the dynamic translation system controller 28 which reconstructs the application context and transfers control to the asynchronous exception handler, as indicated by block 34. If a determination is made at block 38 that the interpreter 27 has not reached a GAR point in the execution stream, the interpreter 27 executes the next instruction or block of instructions, as indicated at block 37, and then determines whether it is at a GAR point in the execution stream at block 38. The steps indicated by blocks 37 and 38 are repeated until a GAR point is reached.

It is possible that other asynchronous exceptions will occur while the interpreter 27 is in the process of executing instructions and looking for GAR points in the instruction stream. These subsequent asynchronous exceptions will be recorded by the system controller 28 and the interpreter 27 will continue executing instructions until a GAR point in the instruction stream is reached. The exceptions are recorded in a data structure maintained by the system controller 28. Once the interpreter 27 reaches a GAR point, all of the asynchronous exceptions will be handled, i.e., the application context will be reconstructed and control will be transferred to the respective asynchronous exception handlers. All of the exceptions are recorded in the data structure maintained by the control system 28 and are serviced in accordance with a predetermined event priority servicing sequence.

One of the advantages of the present invention is that GAR points in the translated code do not have to be at any particular locations in the code. For example, it is not necessary for GAR points to be located at the end of each block of code, as is the case in other known dynamic translation systems. This is because the present invention does not require the use of GAR points which comprise instructions that check to determine whether an asynchronous exception has occurred. In accordance with the present invention, the GAR points may be at, for example, the beginning of a translation, the head of a loop in the interior of a translation, or before an interruptible system call. Furthermore, in accordance with the present invention, the GAR points can be arbitrarily located.

Also, it should be noted that, in accordance with the present invention, the term "GAR point" is meant to denote a location in the translated code where state can be recovered, i.e., where the application context can be correctly reconstructed. However, as stated above, this term is sometimes used in connection with known dynamic translation systems to denote a sequence of instructions which check to determine whether an asynchronous exception is pending and, if so, transfer control out of the translation. In accordance with the present invention, this latter type of GAR point is not necessary because the present invention does not require periodic checks to determine whether an asynchronous exception has occurred. Also, in accordance with the present invention, when an asynchronous exception interrupts the execution of a thread of instructions, only that thread is interpreted by the interpreter 27 and all other threads continue execution in the hardware 30. Therefore, the present invention is well suited for use in a multithreaded environment.

It should be noted that the present invention has only been described with respect to the preferred embodiments and that the present invention is not limited to these embodiments. It will be understood by those skilled in the art that other additions and/or modifications can be made to the embodiments discussed above without deviating from the scope of the present invention.

It should also be noted that the translator 26 and the system controller 28 of the dynamic translation system 24 can be implemented in hardware, software, or a combination of both. It should also be noted that, although the components of the dynamic translation system 24 are functionally illustrated as separate components, some or all of these components can be integrated if so desired, as will be understood by those skilled in the art.

What is claimed is:

1. A dynamic translation system comprising:
   a translator, the translator translating input code into output code and outputting the output code from the translator;
   a memory device in communication with the translator, the memory device receiving the output code from the translator and storing the output code in the memory device;
   a system controller, the system controller determining when an exception has occurred; and
   an interpreter in communication with the translator and with the system controller, wherein when the system controller determines that an exception has occurred, the system controller transfers control to the interpreter and the interpreter begins executing the output code, the interpreter determining when a point is reached in the output code at which application state is recoverable an d providing an indication that said point has been reached to the system controller, the system controller transferring control to an exception handler when said indication is received by the system controller.

2. The dynamic translation system of claim 1, wherein the interpreter executes the input code and provides profile information to the translator, the profile information identifying instructions of the input code to be executed a plurality of times, wherein the translator only stores the instructions of the input code identified in the profile information in the memory device.

3. The dynamic translation system of claim 2, wherein the dynamic translation system is comprised in a computer system, the computer system comprising hardware running an operating system, the operating system notifying the system controller when an exception has occurred.

4. The dynamic translation system of claim 3, wherein the exception corresponds to an asynchronous exception intended for the input code.

5. The dynamic translation system of claim 4, wherein the memory device is a cache memory device.

6. The dynamic translation system of claim 5, wherein the interpreter is a software program being executed by the hardware.

7. The dynamic translation system of claim 6, wherein the hardware obtains the output code from the cache memory device and executes the output code and wherein when the system controller is notified by the operating system that an asynchronous exception has occurred, the system controller causes the execution of the output code in the hardware to be halted and transfers control to the interpreter.

8. A dynamic translation system comprising:
   means for translating input code into output code and for outputting the output code from the means for translating;
   means for storing output code output from the translating means;
   means for controlling the operation of the dynamic translation system, the controlling means comprising means for determining when an exception has occurred; and
   means for executing the output code and for determining when a point is reached in the output code at which application state is recoverable, the executing means receiving a notification from the controlling means that an exception has occurred, wherein when the executing means receives the notification, the executing means begins executing the output code, wherein when the executing means determines that said point has been reached, the executing means provides an indication to the controlling means, wherein when the controlling means receives said indication, the controlling means transfers control to an exception handler.

9. The dynamic translation system of claim 8, wherein the executing means comprises means for interpreting the input code and for providing profile information to the translating means, the profile information identifying instructions of the input code to be executed a plurality of times by hardware in communication with the controlling means, wherein the translating means stores the instructions of the input code identified in the profile information in the means for storing.

10. The dynamic translation system of claim 9, wherein the dynamic translation system is comprised in a computer system, the computer system comprising said hardware, said hardware running an operating system, the operating system notifying the controlling means when an exception has occurred.

11. The dynamic translation system of claim 10, wherein the exception corresponds to an asynchronous exception intended for the input code.

12. The dynamic translation system of claim 11, wherein the executing means is an interpreter, the interpreter being implemented as a software program, the software program being executed by the hardware.

13. The dynamic translation system of claim 12, wherein the hardware obtains the output code from the means for storing and executes the output code and wherein when the controlling means is notified by the operating system that an asynchronous exception has occurred, the controlling means causes the execution of the output code in the hardware to be halted and transfers control to the interpreter, wherein when control is transferred to the interpreter, the interpreter begins executing the output code and checking at the end of each block of instructions of the output code to determine whether said point has been reached.

14. A method for dynamically translating input code into output code, the method comprising the steps of:

translating input code into output code;

storing the output code in a memory element;

detecting when an exception has occurred;

when the occurrence of an exception is detected, executing the translated input code one instruction at a time;

during the execution of the translated input code, determining when a point is reached in the translated input code at which application state is recoverable; and when an exception has occurred and said point has been reached, transferring control to an exception handler.

15. The method of claim 14, wherein only output code identified in profile information as corresponding to hot code is stored in the memory element.

16. The method of claim 15, wherein an operating system of a computer system detects when an exception has occurred and notifies a system controller that an exception has occurred.

17. The method of claim 16, wherein the exception corresponds to an asynchronous exception intended for the input code and wherein an interpreter executes the translated input code and determines when said point has been reached.

18. The method of claim 17, wherein the interpreter notifies the system controller when said point has been reached.

19. The method of claim 18, wherein when the system controller is notified that an asynchronous exception has occurred and that said point has been reached, the system controller transfers control to said exception handler.

* * * * *

UNITED STATES PATENT AND TRADEMARK OFFICE
CERTIFICATE OF CORRECTION

PATENT NO.    : 6,308,318 B2
DATED         : October 23, 2001
INVENTOR(S)   : Krishnaswamy It is certified that error appears in the above-identified patent and that said Letters Patent is hereby corrected as shown below:

Column 8,
Line 25, delete "an d" and insert therefor -- and --

Signed and Sealed this

Ninth Day of March, 2004

JON W. DUDAS
*Acting Director of the United States Patent and Trademark Office*